Nov. 1, 1938.    E. L. ROSE    2,134,803
RELIEF VALVE FOR POWER TRANSMISSIONS
Filed Nov. 6, 1936
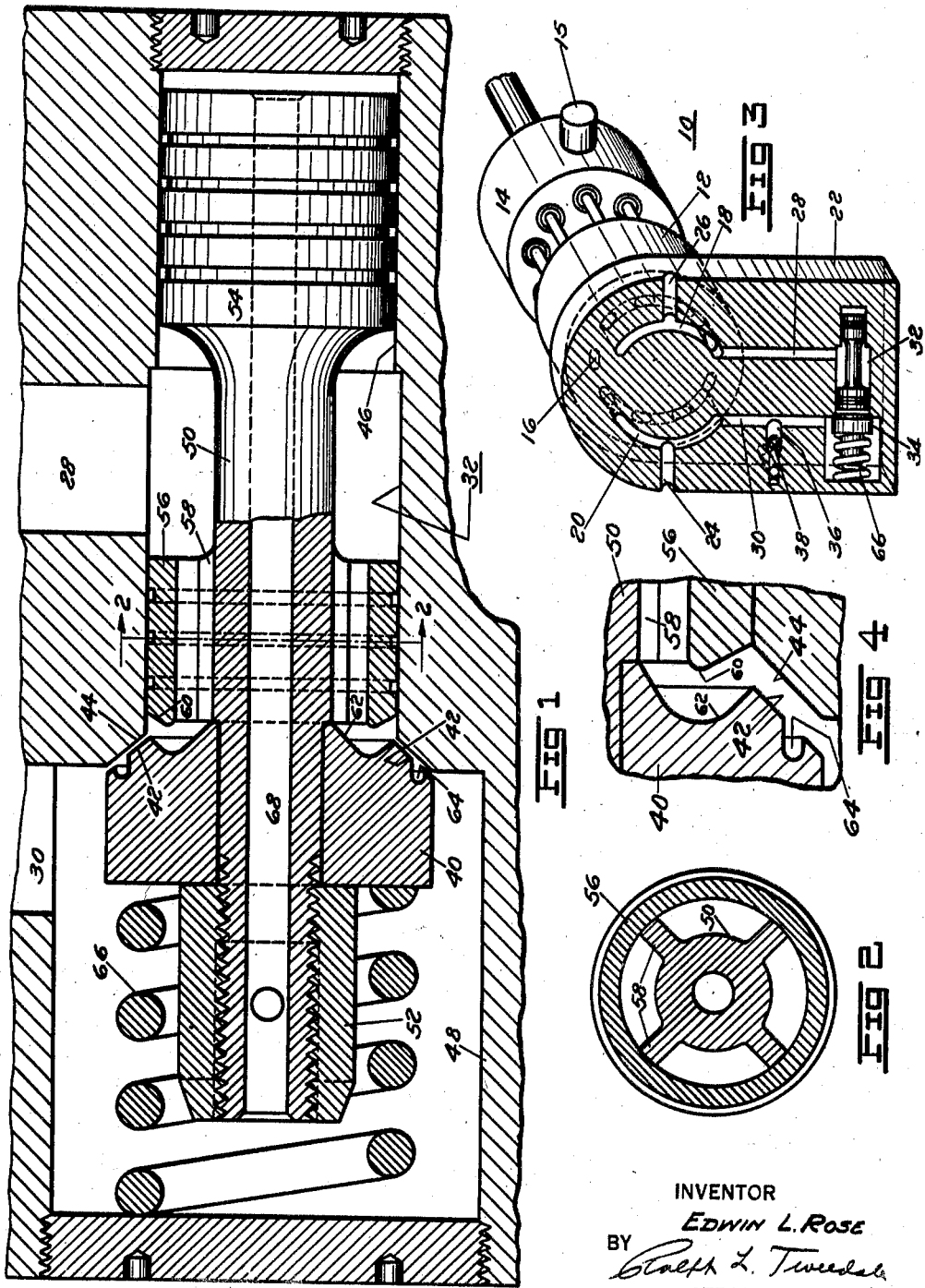

Patented Nov. 1, 1938

2,134,803

UNITED STATES PATENT OFFICE 2,134,803

RELIEF VALVE FOR POWER TRANSMISSIONS

Edwin L. Rose, Watertown, Conn., assignor to The Waterbury Tool Company, Waterbury, Conn., a corporation of Connecticut Application November 6, 1936, Serial No. 109,553

11 Claims. (Cl. 137—53)

This invention relates to relief valves for power transmissions, particularly to those of the type comprising two or more fluid pressure energy translating devices one of which may function as a pump and another as a fluid motor. In transmissions of this character it is necessary to provide means for limiting the pressure developed in the high pressure side of the system and for this purpose a spring-loaded relief valve is customarily employed. In transmissions operating at high pressures, say of the order of two thousand pounds per square inch, it is necessary, if the valve is of the size to carry the full pump discharge, either to employ an excessively large heavy spring or to provide means for partially balancing the fluid pressures acting on the valve member. By providing balancing means, such as a piston subject to fluid pressure forces tending to close the valve and having an area only slightly smaller than the area on the valve exposed to fluid pressure forces tending to open the valve, a comparatively small spring is sufficient to hold the valve closed against very high pressures. It has been found, however, that with a valve of this character which is correctly designed for the static pressure forces exerted on the valve, satisfactory operation can not be obtained due to the effect of dynamic pressure forces which appear as soon as the valve begins to open. Thus it frequently occurs that a valve of this character will open a small distance, far short of its required full opening, and due to pressure drops caused by high velocity flow adjacent the opening will come into equilibrium and prevent further opening of the valve except at an increased pressure.

It is an object of the present invention to provide a pressure limiting means for power transmissions of the character described including a spring-loaded relief valve which is provided with a piston for balancing a substantial portion of the static pressure forces tending to open the valve and which is also provided with means for balancing the dynamic pressure forces at all degrees of valve opening.

A further object is to provide a relief valve capable of passing the full discharge of the pump of the power transmission and operative to move from a very small opening to full opening without requiring a significant increase in pressure; in other words, to provide a relief valve in which the pressure at which it operates is independent of the quantity discharged through the valve.

Further objects and advantages of the present invention will be apparent from the following description, reference being had to the accompanying drawing wherein a preferred form of the present invention is clearly shown.

In the drawing:

Fig. 1 is a fragmentary cross sectional view of a relief valve mechanism incorporating a preferred form of the present invention.

Fig. 2 is a cross section on line 2—2 of Fig. 1.

Fig. 3 is a diagrammatic view of a fluid pressure energy translating device incorporating the present invention.

Fig. 4 is a fragmentary sectional view corresponding to a portion of Fig. 1 with the parts in a different position.

In the form of the invention illustrated in the drawing a fluid pressure energy translating device 10 may be of any suitable construction, and is illustrated as of the well-known "Waterbury" type, comprising a revolving cylinder barrel 12 having bores within which pistons are reciprocated through the medium of a socket ring and tilting box assembly 14. The assembly 14 is mounted for angular adjustment on transverse trunnions 15. Each of the cylinders of the barrel 12 has a port 16 which alternately registers with an arcuate delivery port 18 and a corresponding arcuate suction port 20 formed in a valve plate 22. Suction and discharge conduits 24 and 26 connect with the ports 20 and 18, respectively. The valve plate 22 is formed with a branch conduit 28 connecting with the port 18 and a branch conduit 30 connecting with the port 20. A transverse bore 32 connects the conduits 28 and 30 and with them forms a by-pass conduit connecting the ports 18 and 20. Within the bore 32 is mounted a relief valve 34, which is illustrated in detail in Figs. 1 and 2. The port 20 connects with a transverse bore 36 within which is located a ball check valve 38 forming a replenishing valve for the suction side of the device.

Referring now to Figs. 1 and 2, the valve 34 comprises a poppet valve head 40 having a conical seating surface 42 coacting with a corresponding conical seating surface 44 formed in the bore 32. The bore 32 has a portion 46 of reduced diameter at its right-hand end and has an enlarged portion 48 to the left of the seat 44. The head 40 is rigidly secured to a stem 50 by a retaining nut 52. The stem 50 carries at its right-hand end a piston portion 54 slidably engaged in the reduced portion 46 of the bore 32.

Adjacent the head 40 the stem 50 carries a shroud or sleeve 56 which is mounted by a press or shrink-fit on fins 58 integral with stem 50. The left-hand edge of the shroud 56 is beveled as indicated at 60 while the right-hand face of the head 40 is provided with an annular groove of V-shaped cross section as at 62. There is thus provided a path for fluid passing through the valve which is generally S-shaped as will be seen from Fig. 4 so that before passing between the seating surfaces of the valve, the fluid is reversed axially in its direction of flow. The seating surface 42 of the head 40 is also provided with an annular groove or pocket 64 near the outer edge of the seat 42 for the purpose of causing turbulence before the stream of fluid leaves the valve seating surfaces. The valve 50 is normally held to the right by a spring 66 urging the surfaces 42 and 44 into contact. A central bore 68 provides communication between the chambers at opposite ends of the valve bore 32.

The fluid pressure energy translating device 10 may be operated as a pump by rotating its cylinder barrel 12, the quantity of fluid which is withdrawn from the valve port 20 and discharged to the valve port 18 being determined by the angular adjustment of the tilting box 14 with respect to the plane of the valve plate 22. With the conduits 24 and 26 connected to another fluid pressure energy translating device operating as a fluid motor, the pressure in port 18 will be determined by the resisting load which the motor has to overcome. With the tilting box 14 adjusted for a comparatively small pump discharge only a small opening at the valve 42—44 is necessary to pass the full discharge of the pump at this setting. If the pressure in the port 18 rises beyond the desired maximum value, which is determined by the force of the spring 66, this static pressure is exerted on the valve 50 over the right-hand face of the head 42 in a direction tending to open the valve and over the left-hand end face of the piston 54 in a direction tending to close the valve. Since the area of the former face is slightly larger than the area of the latter, the resultant force is in a direction tending to open the valve and when its magnitude exceeds the force of the spring 66, the valve 50 moves to the left permitting fluid to pass between the surfaces 42 and 44.

At a small valve opening, such as illustrated in Fig. 1, the velocity of flow from conduit 28 through bore 32 and through the space between the shroud 56 and stem 58 and between the end faces 60 and 62 is low. The flow between the surfaces 42 and 44 takes place at extremely high velocities, however, due to the steep pressure gradient which must be produced across these surfaces. In the space adjacent the entering edge of the surfaces 42 and 44, the fluid velocity begins to increase and a certain amount of pressure drop occurs in the fluid adjacent the head 40 immediately before entering the space between the surfaces 42 and 44. In order to insure that this pressure drop does not disturb the predetermined static unbalance of the valve, the groove 64 forms a pocket adjacent the outlet from the valve seating surface to cause turbulent flow at this point. A considerable quantity of energy is thus dissipated in eddy currents, building up a slight back pressure at this point so that the pressure drop between the entrance to the valve seating surface and the groove 64 is less than the pressure drop which would otherwise occur in this distance were the groove 64 not provided. It is thus insured that for small valve openings the resultant pressure forces acting on the valve under dynamic flow conditions will be the same as those for static conditions when the valve is closed.

With the tilting box 14 adjusted for a large pump discharge, the relative effect of the groove 64 decreases so that it becomes substantially negligible at full discharge. This condition is illustrated in Fig. 4 from which it will be seen that the cross section of the path between the surfaces 42 and 44 is substantially equal to that between the end face 60 of the shroud 56 and the annular groove 62 of the head 40. Under these conditions at full valve opening, the velocity between the faces 60 and 62 is of the same order of magnitude as that between the seating surfaces 42 and 44. In order to escape through the valve the fluid must be reversed in its direction of flow twice before leaving the valve. The pressure drops which are created on the end face of the head 40 by high velocity flow adjacent the same are thus compensated or canceled out so that the resultant force acting on the valve is substantially the same as that under static pressure conditions. As a result of the compensation for velocity effect both at the small and large valve openings, the valve 50 opens at the same pressure regardless of the quantity of fluid which must be by-passed in order to prevent a further rise in pressure. Thus, any quantity up to the maximum pump discharge may be by-passed through the valve 34 at a fixed pressure.

While the form of embodiment of the invention as herein disclosed, constitutes a preferred form, it is to be understood that other forms might be adopted, all coming within the scope of the claims which follow.

What is claimed is as follows:

1. In a fluid pressure device having a pair of conduits one of which is subject to high pressure while the other is subject to a low pressure, the combination of means forming a by-pass conduit between said pair of conduits, a valve normally closing said by-pass conduit and having a head subject to pressure tending to open the valve and an opposed balancing piston subject to pressure tending to close the valve, a shroud surrounding the valve near the head and forming with the head a passage through which fluid must pass to escape through the valve, said passage being formed to cause a reversal in the direction of fluid flow axially immediately before the fluid flows through the valve opening.

2. In a fluid pressure device having a pair of conduits one of which is subject to high pressure while the other is subject to a low pressure, the combination of means forming a by-pass conduit between said pair of conduits, a valve normally closing said by-pass conduit and having a head subject to pressure tending to open the valve and an opposed balancing piston subject to pressure tending to close the valve, a shroud surrounding the valve near the head and forming with the head a passage through which fluid must pass to escape through the valve, said passage being formed to provide a generally S-shaped path for fluid flow at the valve opening when viewed in longitudinal section.

3. In a fluid pressure device having a pair of conduits one of which is subject to high pressure while the other is subject to a low pressure, the combination of means forming a by-pass conduit between said pair of conduits, a valve normally closing said by-pass conduit and having a he subject to pressure tending to open the valve and an opposed balancing piston subject to pressure tending to close the valve, means near the head forming with the head a passage through which fluid must pass to escape through the valve, said passage being formed to cause a reversal in the direction of fluid flow axially immediately before the fluid flows through the valve opening.

4. In a fluid pressure device having a pair of conduits one of which is subject to high pressure while the other is subject to a low pressure, the combination of means forming a by-pass conduit between said pair of conduits, a poppet valve normally closing said by-pass conduit and having a head subject to pressure tending to open the valve, an opposed balancing piston connected with the head and subject to pressure tending to close the valve, and means formed in one of the cooperating seating surfaces of the valve for breaking up the continuity of flow at small valve openings to produce a back pressure at the valve opening tending to offset the pressure drop resulting from high velocity flow adjacent the head.

5. In a fluid pressure device having a pair of conduits one of which is subject to high pressure while the other is subject to a low pressure, the combination of means forming a by-pass conduit between said pair of conduits, a poppet valve normally closing said by-pass conduit and having a head subject to pressure tending to open the valve, an opposed balancing piston connected with the head and subject to pressure tending to close the valve, means for causing a reversal of fluid flow in an axial direction prior to entering the valve opening, and effective to offset a velocity pressure drop at the large valve openings, and means for interrupting flow continuity through the valve opening and effective to offset a velocity pressure drop at the small valve openings.

6. In a fluid pressure device having a pair of conduits one of which is subject to high pressure while the other is subject to a low pressure, the combination of means forming a by-pass conduit between said pair of conduits, a poppet valve normally closing said by-pass conduit and having a head subject to pressure tending to open the valve, an opposed balancing piston connected with the head and subject to pressure tending to close the valve, and a turbulence groove formed in one of the cooperating seating surfaces of the valve for causing turbulent flow at the exit from the valve opening.

7. In a fluid pressure device having a pair of conduits one of which is subject to high pressure while the other is subject to a low pressure, the combination of means forming a by-pass conduit between said pair of conduits, a poppet valve normally closing said by-pass conduit and having a head subject to pressure tending to open the valve, an opposed balancing piston connected with the head and subject to pressure tending to close the valve, and means for balancing the velocity pressure drops effective at the valve head at any degree of opening.

8. In a fluid pressure device having a high pressure conduit, means forming a conduit through which pressure fluid may be relieved from the first conduit to a point of lower pressure, a valve normally closing said last conduit and having a head subject to pressure tending to open the valve and an opposed balancing piston subject to pressure tending to close the valve, means near the head forming a passage through which fluid must pass to escape through the valve, said passage being formed to cause a reversal in the direction of fluid flow axially immediately before the fluid flows through the valve opening.

9. In a fluid pressure device having a high pressure conduit, means forming a conduit through which pressure fluid may be relieved from the first conduit to a point of lower pressure, a poppet valve normally closing said last conduit and having a head subject to pressure tending to open the valve, an opposed balancing piston connected with the head and subject to pressure tending to close the valve, and means formed in one of the cooperating seating surfaces of the valve for breaking up the continuity of flow at small valve openings to produce a back pressure at the valve opening tending to offset the pressure drop resulting from high velocity flow adjacent the head.

10. In a fluid pressure device having a high pressure conduit, means forming a conduit through which pressure fluid may be relieved from the first conduit to a point of lower pressure, a poppet valve normally closing said last conduit and having a head subject to pressure tending to open the valve, an opposed balancing piston connected with the head and subject to pressure tending to close the valve, means for causing a reversal of fluid flow in an axial direction prior to entering the valve opening, and effective to offset a velocity pressure drop at the large valve openings, and means for interrupting flow continuity through the valve opening and effective to offset a velocity pressure drop at the small valve openings.

11. In a fluid pressure device having a high pressure conduit, means forming a conduit through which pressure fluid may be relieved from the first conduit to a point of lower pressure, a poppet valve normally closing said last conduit and having a head subject to pressure tending to open the valve, an opposed balancing piston connected with the head and subject to pressure tending to close the valve, and means for balancing the velocity pressure drops effective at the valve head at any degree of opening.

EDWIN L. ROSE.